(12) United States Patent
Fitton

(10) Patent No.: US 7,979,673 B2
(45) Date of Patent: Jul. 12, 2011

(54) METHOD AND APPARATUS FOR MATRIX DECOMPOSITIONS IN PROGRAMMABLE LOGIC DEVICES

(75) Inventor: Michael Fitton, London (GB)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 12/777,193

(22) Filed: May 10, 2010

(65) Prior Publication Data

US 2010/0223445 A1  Sep. 2, 2010

Related U.S. Application Data

(62) Division of application No. 11/546,540, filed on Oct. 10, 2006, now Pat. No. 7,716,454.

(60) Provisional application No. 60/724,454, filed on Oct. 7, 2005.

(51) Int. Cl.
*G06F 7/00* (2006.01)

(52) U.S. Cl. ............... 712/19; 708/407; 708/509; 712/1

(58) Field of Classification Search ............... 708/407, 708/509; 712/1, 19
See application file for complete search history.

(56) References Cited

U.S. PATENT DOCUMENTS

| | | | | |
|---|---|---|---|---|
| 5,179,378 A * | 1/1993 | Ranganathan et al. | ......... | 341/51 |
| 5,630,154 A | 5/1997 | Bolstad et al. | | |
| 6,748,410 B1 * | 6/2004 | Gressel et al. | ............... | 708/491 |
| 7,366,326 B2 | 4/2008 | Chang et al. | | |
| 2009/0310656 A1 * | 12/2009 | Maltsev et al. | ............... | 375/219 |

OTHER PUBLICATIONS

Andraka, Ray; "A survey of CORDIA algorithms for FPGA based computers"; 1998, acm.org, 10 pages.
Boppana, Deepak et al.; "FPGA Implementation of QRD-RLS Algorithm with Embedded Nios Soft Processor"; Altera Corp., 3 pages.
Fitton, M.P. et al.; "Reconfigurable Antenna Processing with Matrix Decomposition Using FPGA Based Application Specific Integrated Processors"; Altera European Technology Centre, 7 pages.
Gotze, Jurgen; "Iterative version of the QRD for adaptive RLS filtering"; Institute of Network Theory and Circuit Design, 12 pages.
Mingqian, Tim Zhong et al.; "QRD-RLS Adaptive Equalizer and its Cordic-Based Implementation for CDMA Systems"; 2003, International Journal on Wireless & Optical Communications, vol. 1, No. 1, pp. 25-39.
Raich, Raviv et al.; "Digital Baseband Predistortion of Nonlinear Power Amplifiers Using Orthogonal Polynomials"; Georgia Institute of Technology, 4 pages.
Walke, Richard L. et al.; "20 GFLOPS QR processor on a Xilinx Virtex-E FPGA"; Defence Evaluation and Research Agency, 11 pages.
Walke, Richard L. et al.; "Architectures for Adaptive Weight Calculation on ASIC and FPGA"; DSiP™ Laboratories, 6 pages.
Altera: "QR Matrix Decomposition," [Online] Feb. 2008, URL: http://www.altera.com/literature_/an/an506.pdf.

(Continued)

*Primary Examiner* — William M Treat
(74) *Attorney, Agent, or Firm* — Ropes & Gray LLP

(57) ABSTRACT

A processor is adapted for performing a QR-decomposition. The processor has a program memory, a program controller, connected to the program memory to receive program instructions, and at least one processing unit. The processing unit includes a CORDIC calculation block, and has a distributed memory structure, with separate memory blocks for storing respective parameter values.

15 Claims, 17 Drawing Sheets

OTHER PUBLICATIONS

De Lange et al.. "Design and implementation of a floating-point Quasi-Systolic general purpose CORDIC rotator for high-rate parallel data and signal processing," 1991, Computer Arithmetic, Proceedings 10$^{th}$ IEEE Symposium on Grenoble, France Jun. 26-28, 1991, Los Alamitos, CA, USA, IEEE Comput. Soc., US, Jun. 26, 1991, pp. 272-281.

Dick, C., et al., "Implementing a Real-Time Beamformer for an FPGA Platform," XCELL Journal [Online] Jun. 2007, XP002538192, URL: http://www.xilinx.com/publications/xcellonline/xcell_60/xc_pdf/p36-40_60-beam.pdf.

European Search Report dated Aug. 13, 2009 for the corresponding European Application No. 06255178.3 filed Oct. 6, 2006.

Fitton et al., "Reconfigurable Antenna Processing with Matrix Decomposition Using FPGA-Based Application Specific Integrated Processors," Presentation, 2004, Altera Corporation.

Fitton et al., "Reconfigurable Antenna Processing with Matrix Decomposition Using FPGA-Based Application Specific Integrated Processors," Altera Corporation, Proceedings from the SDR 04 Technical Conference and Product Exposition, 2004 SDR Forum, 6 pages.

Hamil et al., "Online CORDIC Algorithm and VLSI Architecture for Implementing QR-Array Processors," IEEE Transactions on Signal Processing, IEEE Service Center, New York, NY vol. 48, No. 2, Jan. 1, 2000.

Liu, Z., Dickson, K. et al. "Application-Specific Instruction Set Processor for SoC Implementation of Modern Signal Processing Algorithms," 2005, IEEE Transactions on Circuits and Systems Part I: Regular Papers, EEE Service Center, New York, NY, pp. 755-765.

Sobhanmanesh et al., "VLSI hardward design of QR-Factorizer for a V-BLAST Detector," Signal Processing and Its Applications, 2005, Proceedings of the Eight H International Symposium on Sydney, Australia, Aug. 28-31, 2005, IEEE, vol. 1, Aug. 28, 2005, pp. 323-326.

"SDR Forum2004 Conference Schedule"[Online] Retrieved from URL: http://www.sdrforum.org/pages/sdr04/program_sched.html, http://www.sdrforum.org/pages/sdr04/papers.html.

Altera: "Implementation of CORDIC-Based QRD-RLS Algorithm on Altera Stratix FPGA with Embedded Nios Soft Processor Technology," [Online] Mar. 2004, URL: http://www.altera.com/literature_/wp/wp_qrd.pdf.

Ahmed et al., "Highly Concurrent Computing Structures for Matrix Arithmetic and Signal Processing", Jan. 1, 1982, Computer, IEEE, vol. 15, iss 1, pp. 65-82.

Ligon et al., "Implementation and Analysis of Numerical Components for Reconfigurable Computing", Mar. 6-13, 1999, Proceedings of the Aerospace Conference, vol. 2, pp. 325-335.

* cited by examiner

METHOD AND APPARATUS FOR MATRIX DECOMPOSITIONS IN PROGRAMMABLE LOGIC DEVICES

CROSS-REFERENCES TO RELATED APPLICATIONS

The present application is a divisional of U.S. patent application Ser. No. 11/546,540, filed Oct. 10, 2006, and entitled "METHOD AND APPARATUS FOR MATRIX DECOMPOSITION IN PROGRAMMABLE LOGIC DEVICES", now U.S. Pat. No. 7,716,454, which is herein incorporated by reference for all purposes.

This invention relates to a method and apparatus for matrix decomposition, more specifically for implementation of QR-decomposition (QRD) and recursive least squares (RLS) based QRD, and in particular to an architecture that is suitable for implementation in an FPGA (field programmable gate array).

In many areas of technology, for example in specific areas of signal processing such as wireless communications or image processing, it is necessary to solve problems in linear algebra. One well-known technique for solving such problems is to use the QR-decomposition (QRD)-based recursive least squares (RLS) algorithm.

QR-decomposition is a well-accepted technique employed in matrix calculations. A matrix A is decomposed into Q and R:

$$A = Q \cdot R$$

Where R is an upper triangular matrix and Q is an orthogonal matrix, that is:

$$Q^T \cdot Q = 1$$

In this example, 0 is formed of a sequence of Givens rotations, each designed to annihilate a particular element of the matrix A.

QR-decomposition can be used to solve systems of linear equations; e.g. to solve for matrix w, given input and output 3×3 matrices A and z:

$$A \cdot w = z$$

$$\begin{bmatrix} A_{11} & A_{12} & A_{13} \\ A_{21} & A_{22} & A_{23} \\ A_{31} & A_{32} & A_{33} \end{bmatrix} \begin{bmatrix} w_1 \\ w_2 \\ w_3 \end{bmatrix} = \begin{bmatrix} z_1 \\ z_2 \\ z_3 \end{bmatrix}$$

Decompose A into $Q \cdot R$ as described above, and multiply both sides by $Q^T$, giving:

$$R \cdot w = Q^T \cdot z = z'$$

$$\begin{bmatrix} R_{11} & R_{12} & R_{13} \\ 0 & R_{22} & R_{23} \\ 0 & 0 & R_{33} \end{bmatrix} \begin{bmatrix} w_1 \\ w_2 \\ w_3 \end{bmatrix} = \begin{bmatrix} z'_1 \\ z'_2 \\ z'_3 \end{bmatrix}$$

It is then a simple task to solve for w using backsubstitution, as shown below for N coefficients.

$$w_N = \frac{z'_N}{R_{NN}}$$

$$w_i = \frac{1}{R_{ii}} \left( z'_i - \sum_{j=i+1}^{N} R_{ij} w_j \right)$$

for $i = N-1, \ldots, 1$

It is often appropriate to solve a succession of linear systems, each slightly different from the previous one. Calculating the optimum solution afresh for each iteration is prohibitively expensive in terms of complexity, as each calculation is $O(N^3)$, that is, it requires a number of individual calculations that varies with the cube of N. However, it is possible to update the matrix decomposition in $O(N^2)$ operations.

In particular, the recursive least squares form of QR-decomposition (QRD-RLS) is used to compute and update the least-squares weight vector of a finite impulse response filter. Standard recursive least squares uses the time-averaged correlation matrix of the data; in comparison, QRD-RLS operates directly on the input data matrix. This approach is more computationally complex, but has the advantage that it is more numerically stable than standard RLS. With QRD-RLS, the decomposed matrices that are formed are iteratively updated with a forgetting factor A, as shown in subsequent details on implementation. The values stored in the matrix from previous iterations are multiplied by $\lambda$, where $0 < \lambda \leq 1$, such that the results are more heavily weighted towards recent input values. The case where $\lambda = 1$ is standard QR-decomposition.

There are a number of areas where it is appropriate to apply QR-decomposition, and particularly QRD-based RLS that provides a method for iteratively updating the optimum solution, based on new inputs.

The technique can be applied in general signal processing problems (i.e. time domain equalization). However, it may be appropriate to apply the technique in antenna beamforming.

The algorithm can also be exploited in multi-input multi-output (MIMO) techniques, in particular to solve the channel covariance matrix, allowing the parallel data streams to be extracted.

Another example of where this technique can be used is polynomial-based amplifier digital predistortion. Here an adaptive filter is applied on a number of higher-order polynomials of the input data, for example to apply an inverse of the transfer characteristic of a subsequent power amplifier. In this case, QRD-RLS can be used to calculate and iteratively update the optimum filter coefficients that are applied.

SUMMARY OF INVENTION

According to an aspect of the present invention, there is provided a processor for performing a QR-decomposition. The processor has a program memory; a program controller, connected to the program memory to receive program instructions therefrom; and at least one processing unit. At least one processing unit comprises a CORDIC calculation block; and a distributed memory structure, having separate memory blocks for storing respective parameter values.

According to a second aspect of the present invention, there is provided a processor for mixed Cartesian and polar processing in QR-decomposition. The processor includes at least one boundary cell and at least one internal cell. At least one boundary cell comprises: a first CORDIC unit, for receiving real and imaginary components of an input value, and for supplying first magnitude and phase values as outputs; a second CORDIC unit, for receiving the first magnitude value as an input, and for supplying a second phase value as an output, and supplying a data value R from an output to an input thereof; and a sin/cos calculation unit, for receiving the first and second magnitude values as inputs, and for calculating real and imaginary sin and cos values thereof. At least one internal cell comprises: a complex multiplication block, for receiving real and imaginary components of an input value, for receiving said sin and cos values from said boundary cell, and for supplying a data value R from an output to an input thereof, and for supplying real and imaginary components of an output value.

According to a third aspect of the present invention, there is provided a method of supplying data to a systolic array, comprising: storing data relating to a first frame in a first component of a buffer memory and storing zeroes in a second component of said buffer memory; reading data from said first component of said buffer memory into said systolic array; and, thereafter: storing data relating to a second frame in said second component of said buffer memory.

According to a fourth aspect of the present invention, there is provided a method of reading data out from a systolic array into a backsubstitution buffer, comprising reading data out from said systolic array, and writing data into said backsubstitution buffer, in an order in which it will be processed in a backsubstitution process.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION OF PREFERRED EMBODIMENTS

Figure 1:
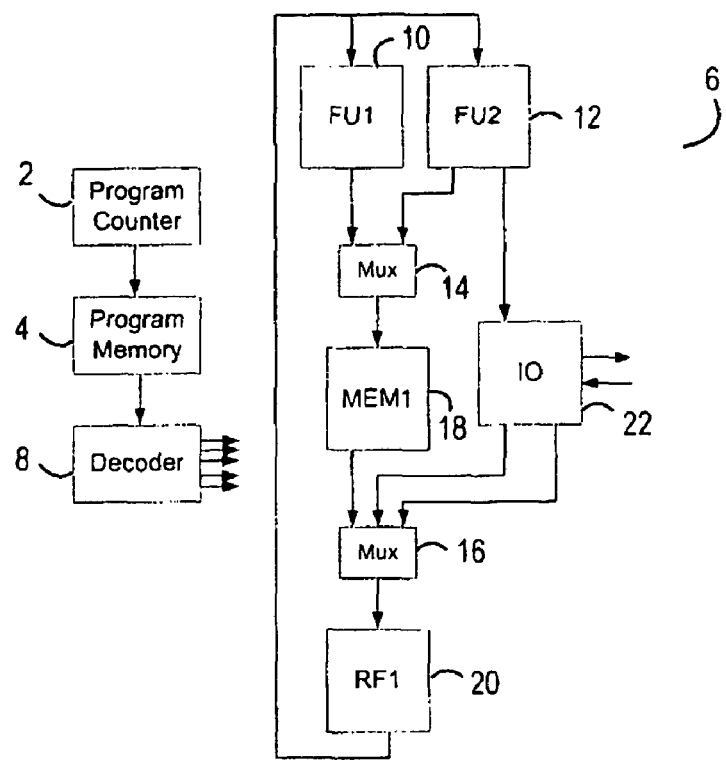
FIG. 1 is a schematic block diagram of the general form of an FPGA-based ASIP.

FIG. 1 shows the general form of an FPGA-based application-specific integrated processor (ASIP). A pipelined program memory 2 and program counter 4 supply the machine with an encoded instruction word. The program memory 2 is typically included within the processor 6 and exploits the dual-port facilities of the memories to allow external sources to load program code.

The encoded instruction word feeds a decode block 8 that decodes the data to provide a set of control signals for the processor 6. Control signals include: immediate values such as literals, register file read and write addresses; function unit enable and operation select signals; multiplexer operand-select codes.

The processing core 6 includes a set of function units 10, 12 and the multiplexers 14, 16 that route data between them. The function units include memories 18, registers, basic arithmetic and logic units, and multiply-add blocks. These blocks may exploit specific features of the FPGA device or may rely on standard libraries such as the library of parameterized modules (LPM). In addition, custom application specific units 20 may be included.

Function units 22 implementing bus-masters, slaves, general purpose I/O, and streaming point-to-point protocols provide I/O functionality.

Figure 2:
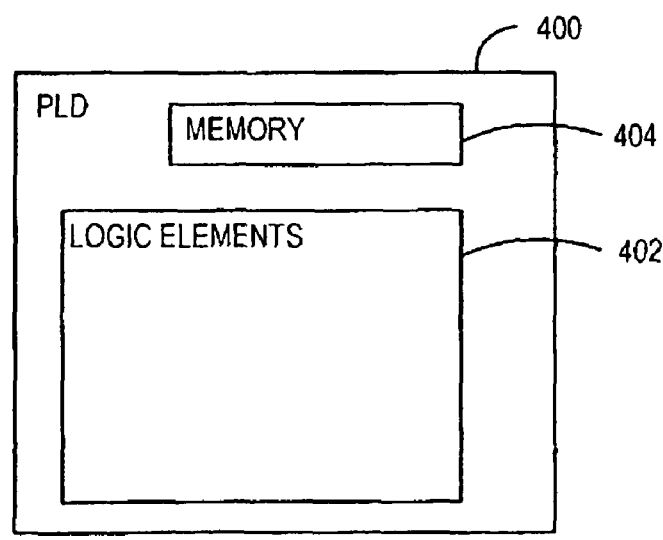
FIG. 2 is a schematic diagram of a programmable logic device that can be used for implementation of the processor in accordance with the invention.

FIG. 2 is a schematic diagram illustrating a programmable logic device (PLD), in the form of a Field Programmable Gate Array 400. As is conventional, the illustrated device 400 includes logic array elements 402 and dedicated memory 404. The interconnections between the array elements 402 and elements of the memory 404 can be altered, based on configuration data that is supplied to the device. This configuration data therefore determines the functions that the configured device can perform.

FIG. 1, and the following Figures, therefore illustrate the functional relationships between components of the device, it being understood that these functional components are formed from the logic array elements 402 and elements of the memory 404 by suitable configuration data.

The recursive least squares form of QR-decomposition (QRD-RLS) is suitable for a parallel implementation in the form of a systolic array, which on the face of it appears ideal for a hardware solution, in particular in a PLD as shown in FIG. 2. However, the resulting architecture can be difficult to reconfigure or scale, and may become too large, especially for a large number of inputs or limited hardware requirement. In this case, the mapping of the systolic array processing cells to available hardware resources necessitates complex control from a conventional RTL perspective. In contrast, using the application specific processor facilitates control and re-use of hardware, permitting a readily scalable and reconfigurable solution. This is complementary to a conventional general-purpose processor approach, as an ASIP solution permits efficient use of the available hardware, targeted for a specific set of requirements.

Figure 3:
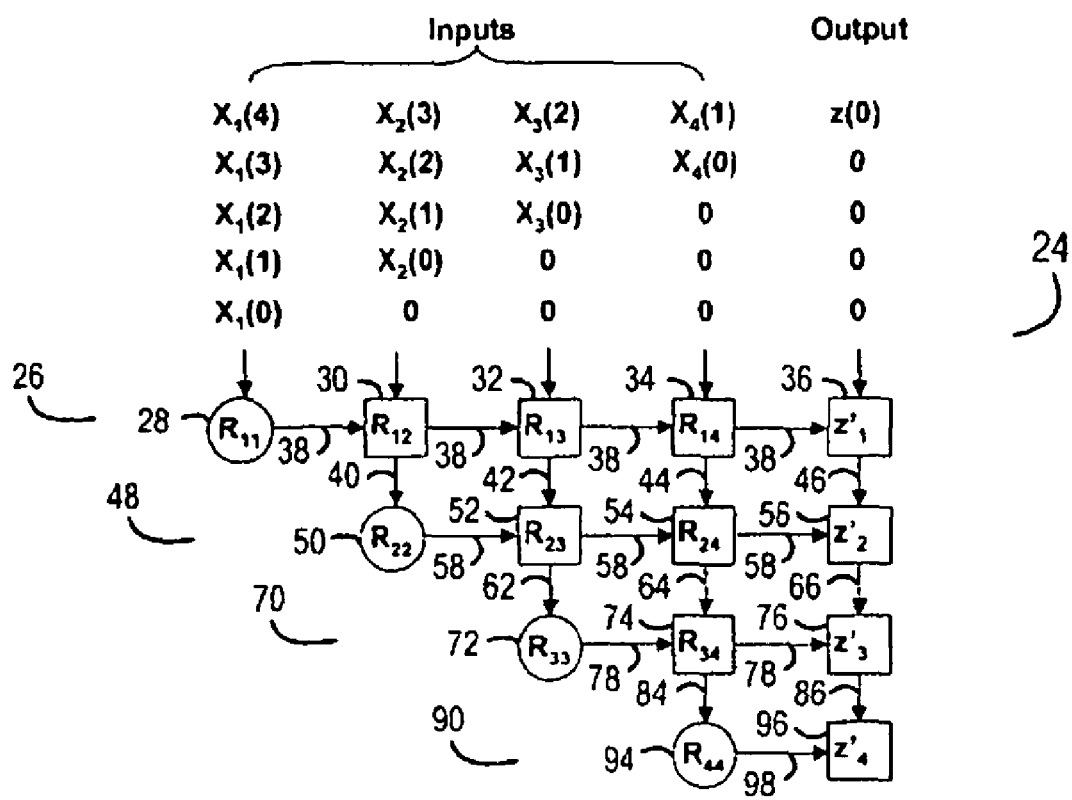
FIG. 3 is a schematic diagram of a systolic array according to one aspect of the present invention.

FIG. 3 is a block schematic diagram of an example of a systolic array 24 used for GIRD-RLS, in which there are four 'input' coefficients to array 24 and one 'output' coefficient. Similar systolic arrays may be envisaged with a different number of input coefficients.

The top row 26 of array 24 has five processing cells: one boundary cell 28 operating in vectorize mode to calculate a Givens rotation, followed by four internal cells 30, 32, 34, 36 operating in rotate mode to apply a calculated Givens rotation. Boundary cell 28 receives an input $X_1(0)$, generates one or more phase outputs 38 and passes the or each phase output sideways to internal cell 30.

Internal cell 30 receives an input $X_2(0)$ and combines it with the or each phase output 38 to generate a new output 40. The or each phase output 38 is passed to each internal cell in row 26 without being altered. Similarly, each remaining internal cell in row 26 combines the or each phase output 38 with an input to create outputs 42, 44, 46.

Each new output 40, 42, 44, 46 is passed downwards to row 48. Row 48 has one boundary cell 50 and three internal cells 52, 54, 56. Boundary cell 50 receives output 40 and generates one or more new phase outputs 58. The or each new phase output 58 is passed sideways to each internal cell 52, 54, 56 in row 48.

Internal cell 52 receives output 42 and the or each phase output 58 and generates a new output 62; internal cell 54 receives output 44 and the or each phase output 58 and generates a new output 64; and internal cell 56 receives output 46 and the or each phase output 58 and generates a new output 66.

Each new output 62, 64, 66 is passed downwards to row 70. Row 70 has one boundary cell 72 and two internal cells 74, 76. Boundary cell 72 receives output 62 and generates one or more new phase outputs 78. The or each new phase output 78 is passed sideways to each internal cell 74, 76 in row 70.

Internal cell 74 receives output 64 and the or each phase output 78, and generates a new output 84; and internal cell 76 receives output 66 and the or each phase output 78, and generates a new output 86.

Each new output 84, 86 is passed downwards to row 90. Row 90 has one boundary cell 94 and one internal cell 96. Boundary cell 94 receives output 84 and generates one or more new phase outputs 98. The or each new phase output 98 is passed sideways to internal cell 96.

In addition to creating outputs, each cell, boundary and internal, generates a value that is stored inside the cell.

Data is input to array 24 in a time-skewed manner. The calculations for a particular decomposed matrix (R), and therefore for a particular time snapshot of coefficients, propagate through the array on a diagonal wavefront.

It should be noted that array 24 is a logical representation of the processing required, and is not representative of the system architecture employed to implement it. While mapping one processing unit to each cell would give the highest throughput possible, such an approach is too resource-intensive. In practice, a smaller number of processing units is employed (possibly even one processing unit) and time-shared between the cells. Further details of the mapping scheme are given below.

Figure 4:
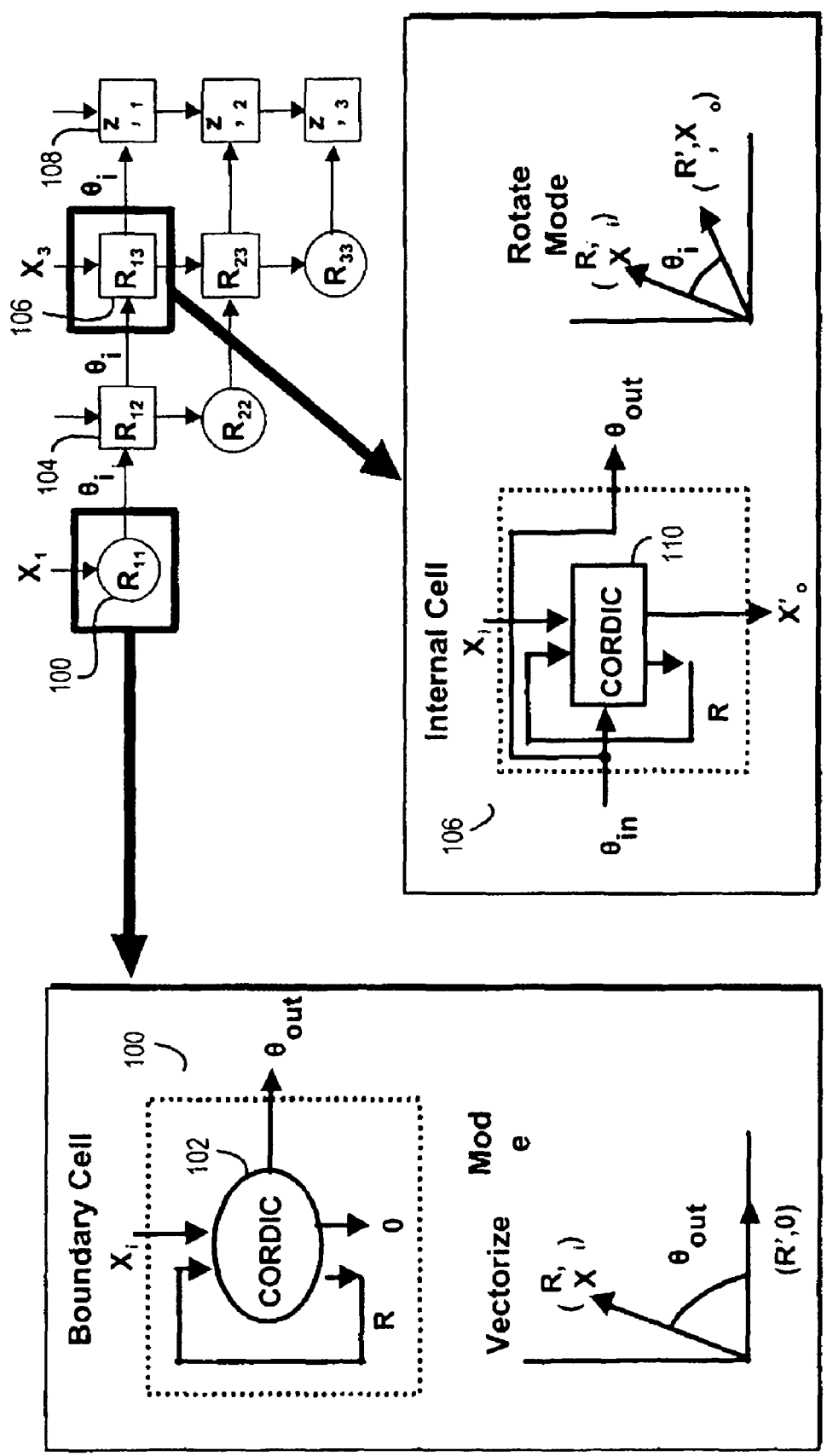
FIG. 4 is a schematic block diagram showing the method of operation for processing cells receiving real inputs, according to one aspect of the present invention.

FIG. 4 is a schematic block diagram showing the method of operation for processing cells receiving real inputs, according to one aspect of the present invention.

Each cell contains at least one CORDIC (coordinate rotation digital computer) unit. CORDIC is a hardware-efficient algorithm for computing functions such as trigonometric, hyperbolic and logarithmic functions. It works by rotating the phase of a complex number by multiplying it by a succession of constant values. However, the constant values can be multiples of 2, and thus in binary arithmetic each calculation can be done using solely shift-and-adds. The CORDIC unit can therefore be conveniently implemented in a PLD as shown in FIG. 2.

Two types of systolic node processing elements are employed here: internal cells (squares) and boundary cells (circles). Boundary cells are used to calculate the Givens rotation that is applied across a particular row in the matrix. As such, the new input is compared to the stored data value (denoted $R_{ij}$), and a unitary transform is calculated which annihilates the previous value (which is the conceptual output) and calculates the new value of this element. This value corresponds to the magnitude of a vector made up of the input value and the previous value (scaled by the forgetting factor λ).

Boundary cell 100 uses CORDIC unit 102 to achieve this by iteratively rotating the vector ($R_{ij}$, $X_i$) until the input is annihilated and a new vector ($R'_{ij}$, 0) is output.

The unitary transform (Givens rotation $\theta_{out}$) which is calculated in boundary cell 100 is output and applied to the remainder of the row by internal cells 104, 106, 108 (with an index $R_{ij}$, where i≦j). For example, internal cell 106 uses CORDIC unit 110 to apply the transform to input values, and previous (stored) values, to calculate a new (stored) value, and an output. The transform is also output, to be used by the next boundary cell 108 in the row.

Figure 5:
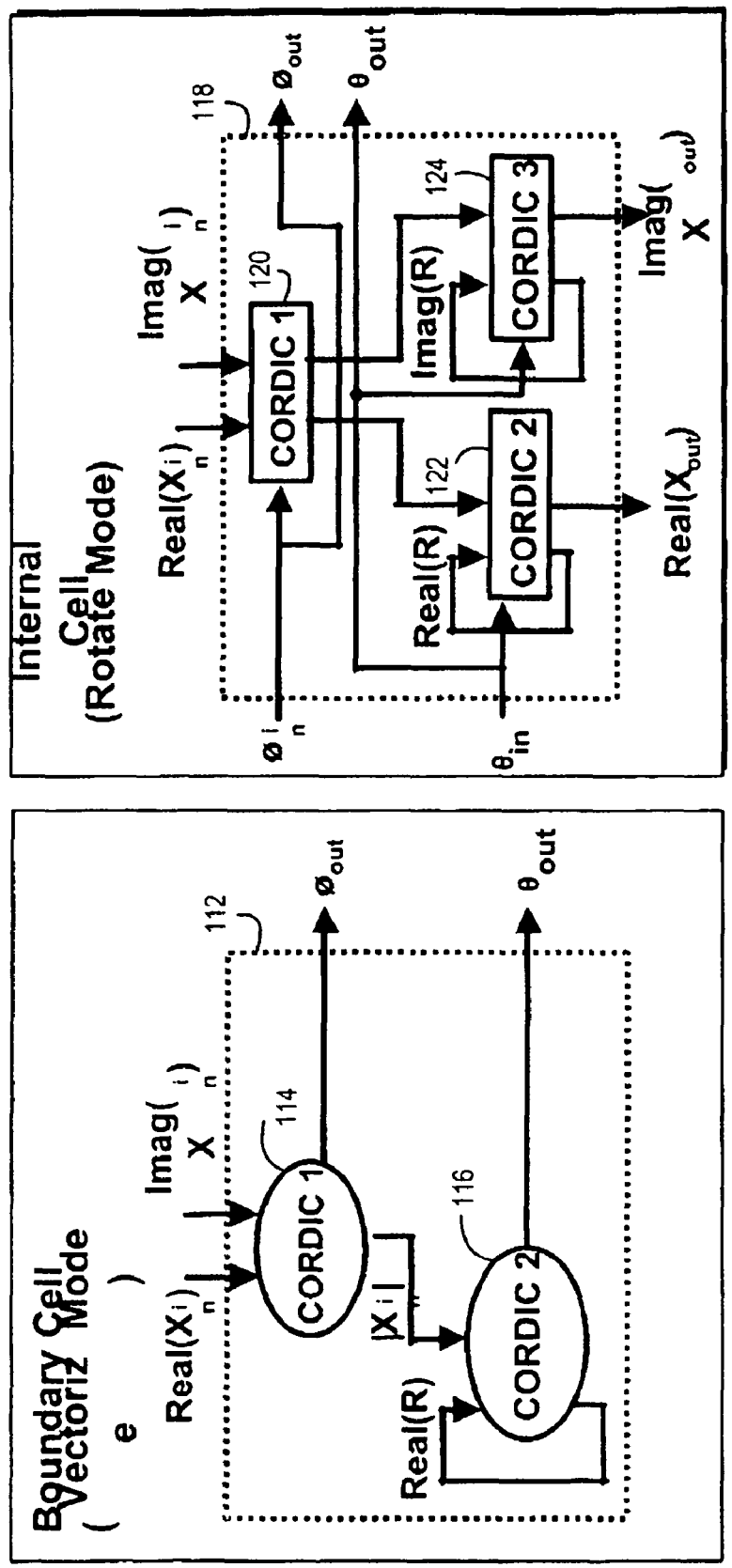
FIG. 5 is a schematic block diagram showing the method of operation for processing cells receiving complex inputs, according to one aspect of the present invention.

FIG. 5 is a schematic block diagram showing the method of operation for cells receiving complex inputs, according to one aspect of the present invention.

The method of operation is similar to that in the case of real inputs; however, in this case at least two CORDIC processes are required in each processing unit. Boundary cell 112 requires two CORDIC processes 114, 116 to calculate the Givens rotations that are applied across a particular row in the matrix. First, the new (complex valued) input is received, and a unitary transform calculated by CORDIC block 114 which annihilates the phase of the complex input, and outputs the phase $\theta_{out}$ and the magnitude of the input $|X_{in}|$. The magnitude of the input, $|X_{in}|$, is passed to another CORDIC block 116, which compares it with the stored data value, $R_{ij}$, and calculates a unitary transform (Givens rotation $\theta_{out}$) which annihilates the previous value (which is the conceptual output) and calculates the new value of this element.

The unitary transforms ($\phi_{out}$ and $\theta_{out}$) which are calculated in boundary cell 112 are output and applied to the remainder of the row by internal cells (with an index $R_{ij}$ where i≦j). For example, internal cell 118 applies the transforms (shown as $\phi_{out}$ and $\theta_{out}$ as the inputs to the cell 118) to input (complex) values, and previous (stored, complex) values, to calculate a new (stored) value, and a (complex) output. The transforms are also output, to be used by the next boundary cell in the row.

CORDIC block 120 receives a complex input and applies the first Givens rotation $\theta_{in}$. The real part of the so-transformed complex input is passed to CORDIC block 122, where it is paired with the real part of complex stored data value $R_{ij}$ and the second Givens rotation $\theta_{in}$ applied. Similarly, the imaginary part of the so-transformed complex input is passed to CORDIC block 124, where it is paired with the imaginary part of complex stored data value $R_{ij}$, and the second Givens rotation $\theta_{out}$ applied.

Although separate CORDIC blocks are shown in FIGS. 4 and 5, it will be appreciated that fewer CORDIC blocks than shown could be used by employing time-sharing techniques. For example, a single CORDIC block could perform all the calculations described above for a single processing cell in consecutive steps. However, such a system would have the disadvantage of reduced throughput.

The overall system is implemented using a custom processor approach, one or more processing units being controlled by a program and a program controller. This provides an efficient solution, exploiting significant time multiplexing between the processing units for an efficient implementation, and allowing a trade-off between performance and size. Moreover, the system has run-time flexibility in: the number of coefficients, the size of frame (i.e. number of inputs to take), real/complex numbers and the number of bits resolution.

The system has run-time flexibility in its application: the same hardware can be used with different parameters, e.g. smart antennas, space-time coding channel estimation and MIMO reception. The use of a program controller to control multiple processing units allows the system to be scaled up or down easily. It is a simple task to add more processing units, improving the calculation time, or reduce the number of processing units, improving hardware efficiency.

Figure 6:
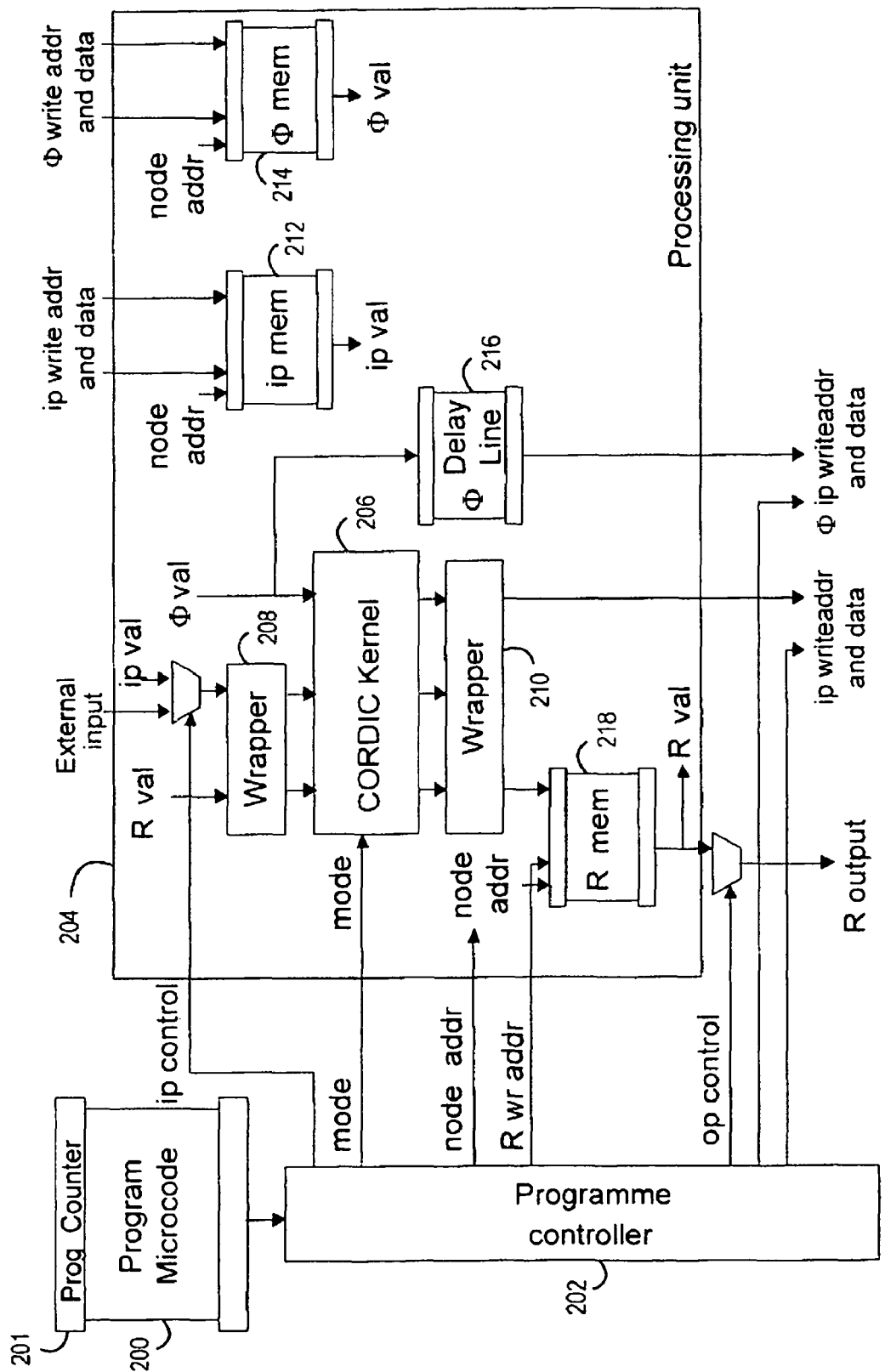
FIG. 6 is a schematic block diagram of an example of the system according to one aspect of the invention, in which there is one processor.

FIG. 6 is a schematic block diagram of an example of the system according to one aspect of the invention, in which there is one processor.

As shown in FIG. 6, the overall design comprises a program 200, program counter 201, and a program controller 202 which controls the functionality of the other modules and resets the calculation if required.

The overall design also includes an input-formatting block, not shown in FIG. 6. This reads in the input data in the correct order and the correct format.

The processing unit 204 comprises a CORDIC block 206 to do the calculation, an input wrapper 208 and an output wrapper 210 for the CORDIC block 206 (to ensure correct number format) and a distributed memory structure that (along with the scheduling) allows multiple processing units to write to each other whilst ensuring there is only one read operation and one write operation per cycle.

The overall design also includes an output control block, not shown in FIG. 5, that determines when to output the R matrix value (to a backsubstitution module).

As shown in FIG. 5, the processing unit 204 includes logic blocks (CORDIC kernel 204, and wrappers on the input 206 and output 208 of the CORDIC kernel 204), and data memories (ip mem 212, φ mem 214, and R mem 218).

The programme controller 202 provides inputs to the processing unit 204, namely:
node addr—the address of the node(s) to process.
mode—the mode of operation for that node (boundary cell or internal cell).
R wr addr—the destination address for the R value.
φ addr or output value addr—the destination address of the outputs.
input (ip) control—an indication whether the input for a particular node is from another node or from the external input.
output (op) control—a flag to indicate whether an output is required, and what the corresponding address is.

Internal signals within the processing unit 204 include: R value, which is read from R mem 218; φ value, which is the applied Givens rotation, read from φ mem 214; and ip value, which is the output received from an internal cell in the row above in the systolic array, read from ip mem 212. All internal signals are read from internal memories from read address <node addr>, supplied by programme controller 202.

Program controller 202 first sends ip control to indicate whether either an external input or ip value should be processed. Wrapper 208 receives R value and either an external input or ip value, puts both values into the correct format for CORDIC processing, and outputs them to CORDIC kernel 206. CORDIC kernel receives both inputs from wrapper 208, as well as a signal from program controller 202 indicating whether CORDIC kernel 206 is to operate either in vectorize mode (i.e. as a boundary cell) or in rotate mode (i.e. as an internal cell).

φ value is written to φ delay line 216, from where it is further output to φ mem 214. φ delay line 216 delays writing φ value to φ mem 214 to account for latency in the CORDIC kernel 206. CD delay line 216 may, for example, be a FIFO memory.

If CORDIC kernel 206 is to operate in rotate mode, CORDIC kernel 206 also receives φ value and applies the rotation as described in FIGS. 4 and 5. It then outputs the transformed ip value and the new R value to output wrapper 210.

If CORDIC kernel 206 is operating in vectorize mode, it does not require φ value, and rotates the vector (R, X) so to annihilate the input, as described above. In this case, the new R value is output to wrapper 210, and the generated φ value is output to φ mem 214.

Output wrapper 210 stores the new R value in R mem 218, and outputs the new ip value to ip mem 214 if operating in rotation mode.

Program controller 202 further supplies R mem 218 with a signal op control, indicating if the stored R value is to be output to a backsubstitution module (not shown).

In the example above, wherein the system comprises one processing unit 204, ip value and φ value are rewritten in ip mem 212 and φ mem 214, respectively, after undergoing processing. In general, however, there can be any desired number, n, of processing units 204. In the general case, ip value and φ value are rewritten in ip mem 212 and φ mem 214 of a different processing unit according to rules that are outlined below.

Scheduling the operations of the processing units is key. It is necessary to ensure that all nodes are processed whilst observing required data dependencies, and to avoid memory contention (i.e. multiple samples being written to one memory at the same time).

The operation of one or more nodes in the systolic array can be mapped onto each processing unit. In one embodiment of the invention, all nodes can be mapped onto one unit. This gives a very efficient hardware implementation but longer calculation time.

Figure 7:
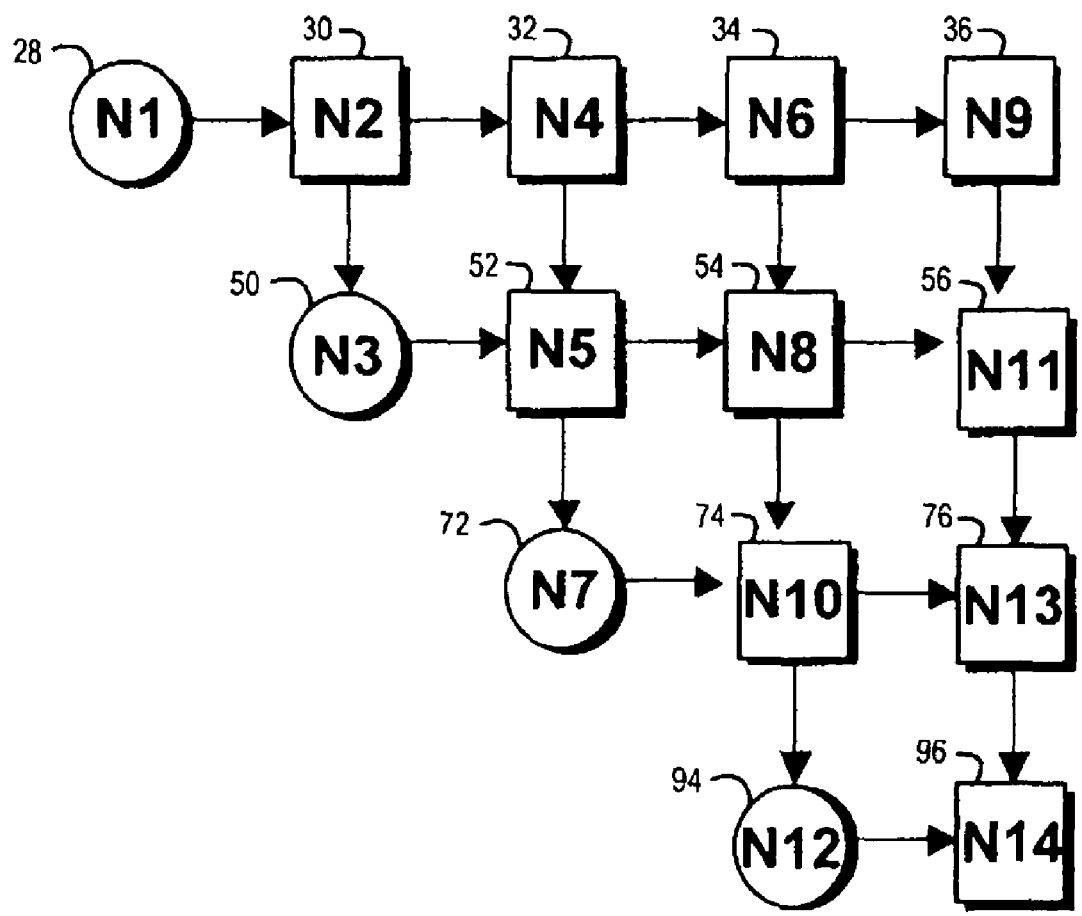
FIG. 7 is a schematic block diagram of the data dependency of the systolic array elements when operating with one processor unit.

FIG. 7 is a block schematic diagram illustrating the order of processing of example systolic array 24 when there is one processing unit. In general, processing occurs on diagonals. The order is such that the smallest amount of memory is required, and all data dependencies are satisfied. Here the nodes are numbered N1-N14 in the same order as data appears on them.

In another embodiment, multiple processing units can be used.

In the method of discrete mapping, one processor unit performs only boundary cell operations, while others perform internal cell operations. This allows optimization of processors, and requires the minimum amount of memory. Other resource-sharing techniques are possible. However, discrete mapping requires the pipeline to be broken to allow calculations to be finished before the next input samples are read in.

A modified discrete mapping approach can be used to ensure no memory contention. The proposed technique uses the minimum amount of memory (otherwise double buffering would be required).

Figure 8:
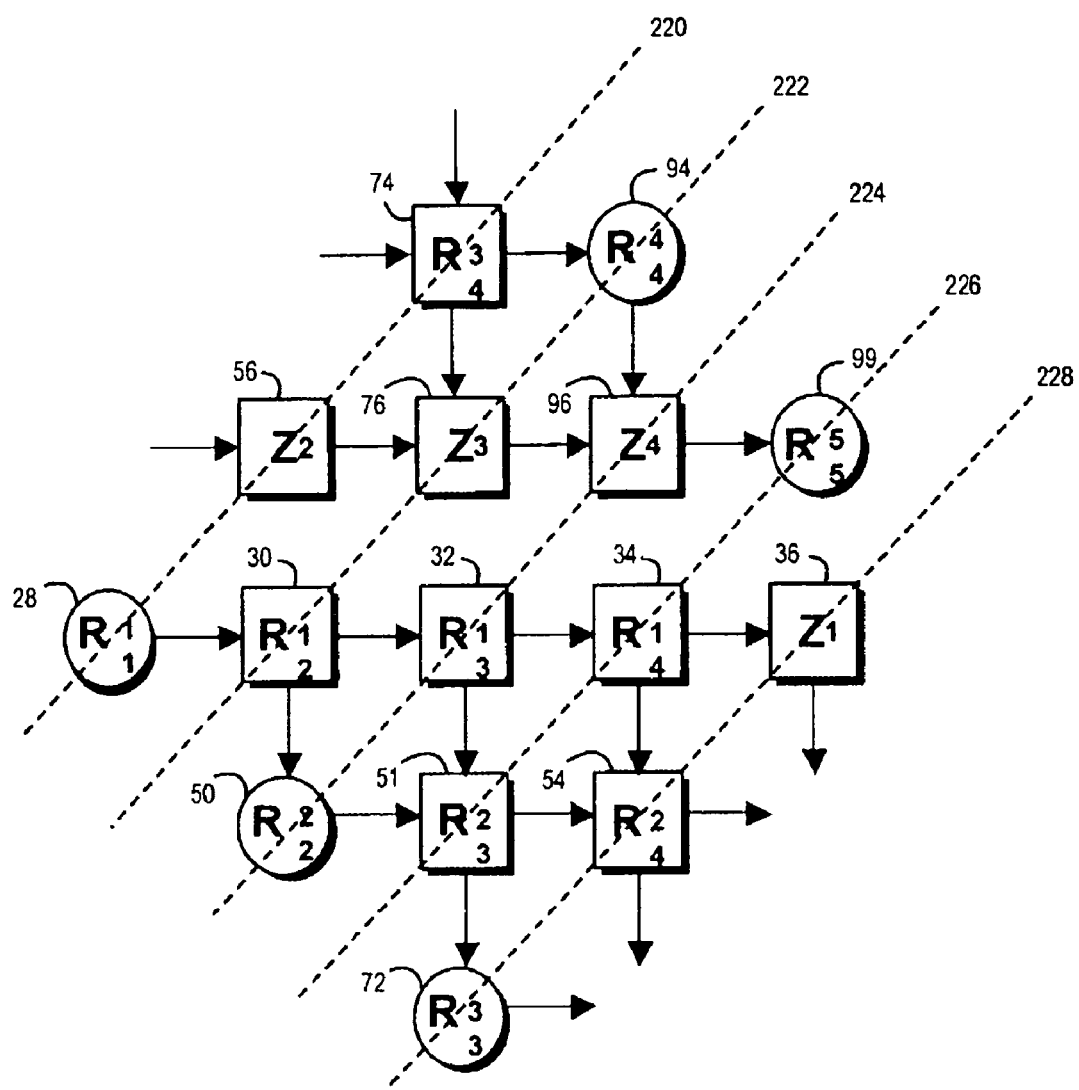
FIG. 8 is a schematic block diagram of a systolic array mapping in accordance with an aspect of the invention.

FIG. 8 is a block schematic diagram illustrating the modified discrete mapping approach for multiple processing units, for the example systolic array given in FIG. 3. The same reference numerals will be used in this Figure.

The position of cells 56, 74, 76, 94, 96 is redrawn above the original array such that five diagonals 220, 222, 224, 226, 228 are formed. Diagonal 220 comprises cells 28, 56 and 74; diagonal 222 comprises cells 30, 76 and 94; diagonal 224 comprises cells 32, 50 and 96; diagonal 226 comprises cells 34, 52; and diagonal 228 comprises cells 36, 54 and 72.

The repositioning of the cells allows the introduction of a further cell 99 in the systolic array without increasing the latency of the system. This cell 99 may, for example, be used to calculate the error term.

Figure 9:
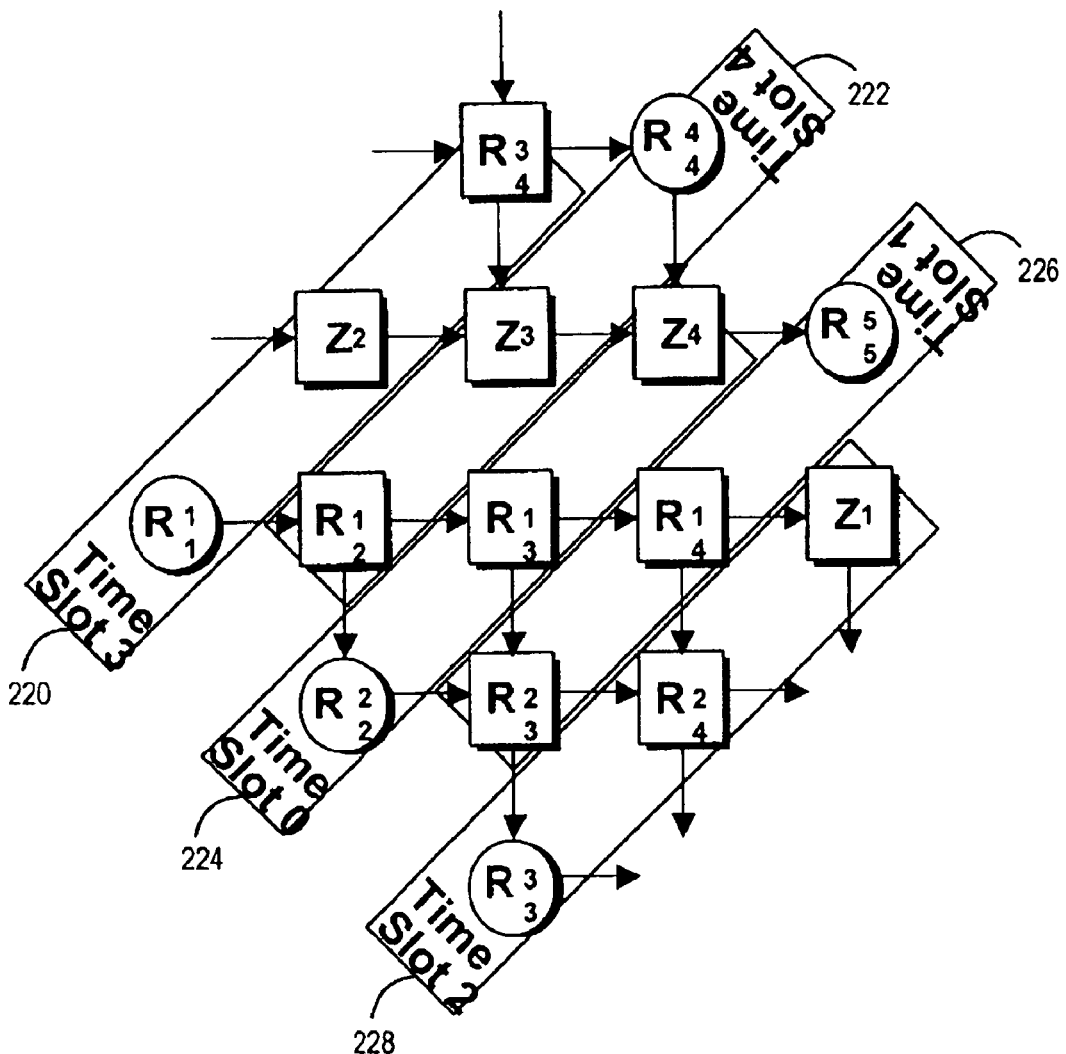
FIG. 9 is a schematic block diagram of the systolic array mapping showing the time slots for scheduling between three processor units.

FIG. 9 is a block schematic diagram further illustrating the modified discrete mapping approach.

One new input vector will be read in during each time period, referred to as a beat, and every node in the array will be clocked once. If the number of processing units is less than the number of nodes (which is likely) then each beat is divided into multiple time slots.

The nodes are divided into groups according to the time slots in which they will be processed. Specifically, diagonal 220 corresponds to time slot 3; diagonal 222 corresponds to time slot 4; diagonal 224 corresponds to time slot 0; diagonal 226 corresponds to time slot 1; and diagonal 228 corresponds to time slot 2.

The optimum number of processors is the same as the number of nodes on the longest diagonal: one boundary cell and two internal cells in this case.

Figure 10:
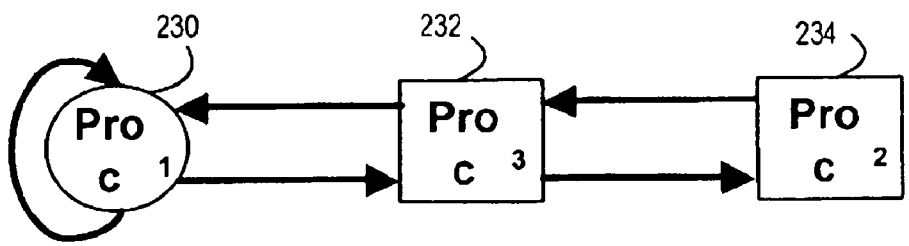
FIG. 10 is a schematic block diagram showing the scheduling of three processor units.

FIG. 10 is a block schematic diagram illustrating the operation of the three processors 230, 232, 234 in this case. Thus, the three nodes in each time slot in FIG. 9 are mapped onto the three processors. The arrows indicate the flow of data between the three processors 230, 232, 234.

Figure 11:
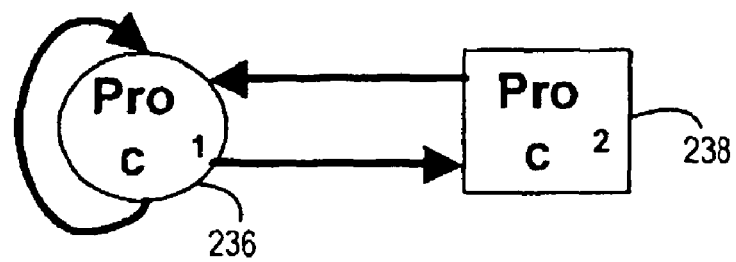
FIG. 11 is a schematic block diagram showing the scheduling of two processor units.

Different mappings are possible. For example, FIG. 11 illustrates the operation of two processors 236, 238 for the array of FIG. 8, and the arrows indicate the flow of data between the processors. Thus it is possible to reduce the number of processing units; however, using fewer than the optimum number of processors means that processor 238, performing internal cell operations, will be more heavily loaded than processor 236, performing boundary cell operations. This approach decreases the required resources but increases the calculation time.

Figure 12:
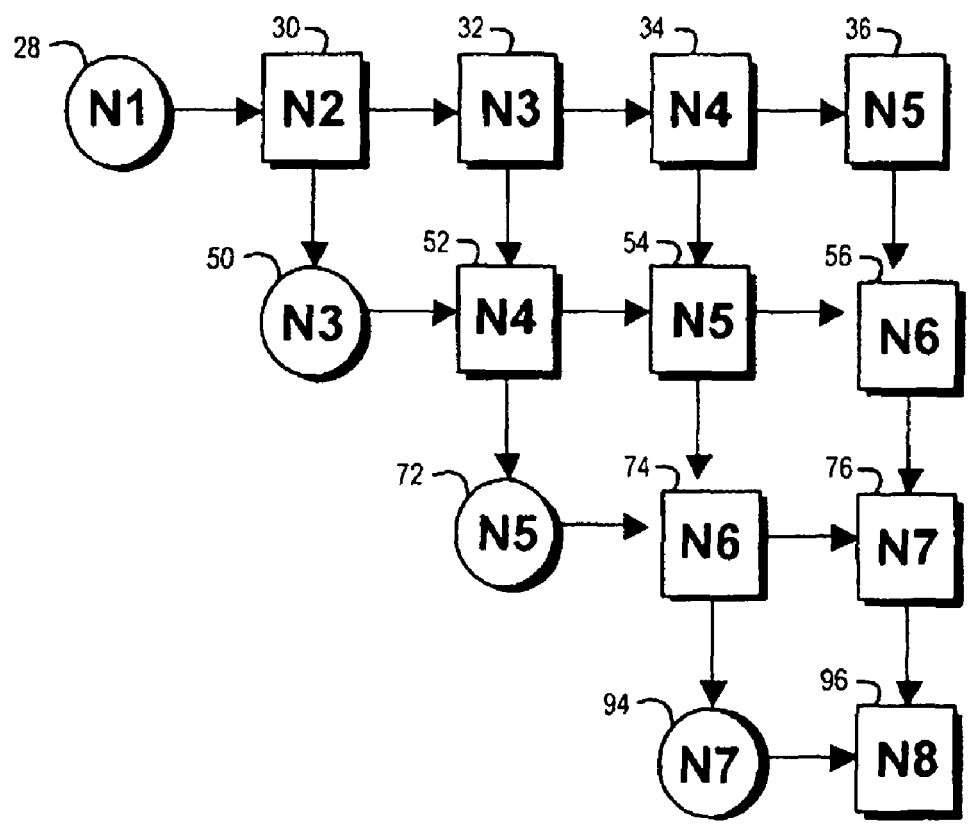
FIG. 12 is a schematic block diagram of the data dependency of the systolic array elements when operating with three processor units.

FIG. 12 is a schematic block diagram showing the order in which data appears in the example systolic array of FIG. 2 (5×5 case). The data dependency is to ensure that the operation of a particular node does not occur before the output of the previous beat on the input cell is received.

Thus, the order in which data appears in the cells is: firstly, the cell indicated by N1, namely the cell 28; secondly, the cell indicated by N2, namely the cell 30; thirdly, the cells indicated by N3, namely the cells 32 and 50; then the cells 34 and 52 indicated by N4; the cells 36, 54 and 72 indicated by N5; the cells 56 and 74 indicated by N6; the cells 76 and 94 indicated by N7; and, finally, the cell 96 indicated by N8.

For discrete mapping, calculations must be finished before the next input samples are read in, e.g. the nodes (indicated by N3 and N8 in FIG. 12) allocated to time slot 0 are fed by the nodes (indicated by N2 and N7 in FIG. 112 allocated to time slot 4 (see FIG. 9). Therefore the result from time slot 4 must be ready before time slot 0 can be run on the next beat of the systolic array.

With a single processor, and assuming a restart interval of 1 (i.e. assuming that data can be loaded in, and an answer can be read out, within one cycle), the pipeline can be fully loaded if the latency is less than the number of nodes, e.g. in the single processor case, if the latency is less than or equal to 14 beats the calculation for node N1 will be available before node N2 for the next beat is clocked.

The pipeline can be fully loaded if the latency of the processing unit is not too large or too small.

If the latency is larger than the number of nodes: processing is stopped until the output appears. E.g. in the 5×5 case there are 14 nodes; if the latency is more than 14 beats, processing cannot start, e.g. node N2 on beat n cannot be clocked before the output of node N1 on beat n−1 is received.

If the latency is too small, there may be a problem if the output of a node is ready too early, e.g. if the latency is only 2 beats, the output of node N7 is ready before node N10 is processed. In this case, two separate memories may be needed (one for this beat and one for the last beat). The maximum time between nodes is given by (num_coeffs/2)+1.

As described above, the QRD operation is implemented as a series of Givens rotations. This involves calculating a rotation in the boundary cell, and applying it in the remaining cells. For example, Matlab code is available for performing these steps, which are also described in "Numerical recipes in C" ($2^d$ ed) page 98, section 2.10, "QR Decomposition". The calculation and application are performed using CORDIC.

Figure 13:
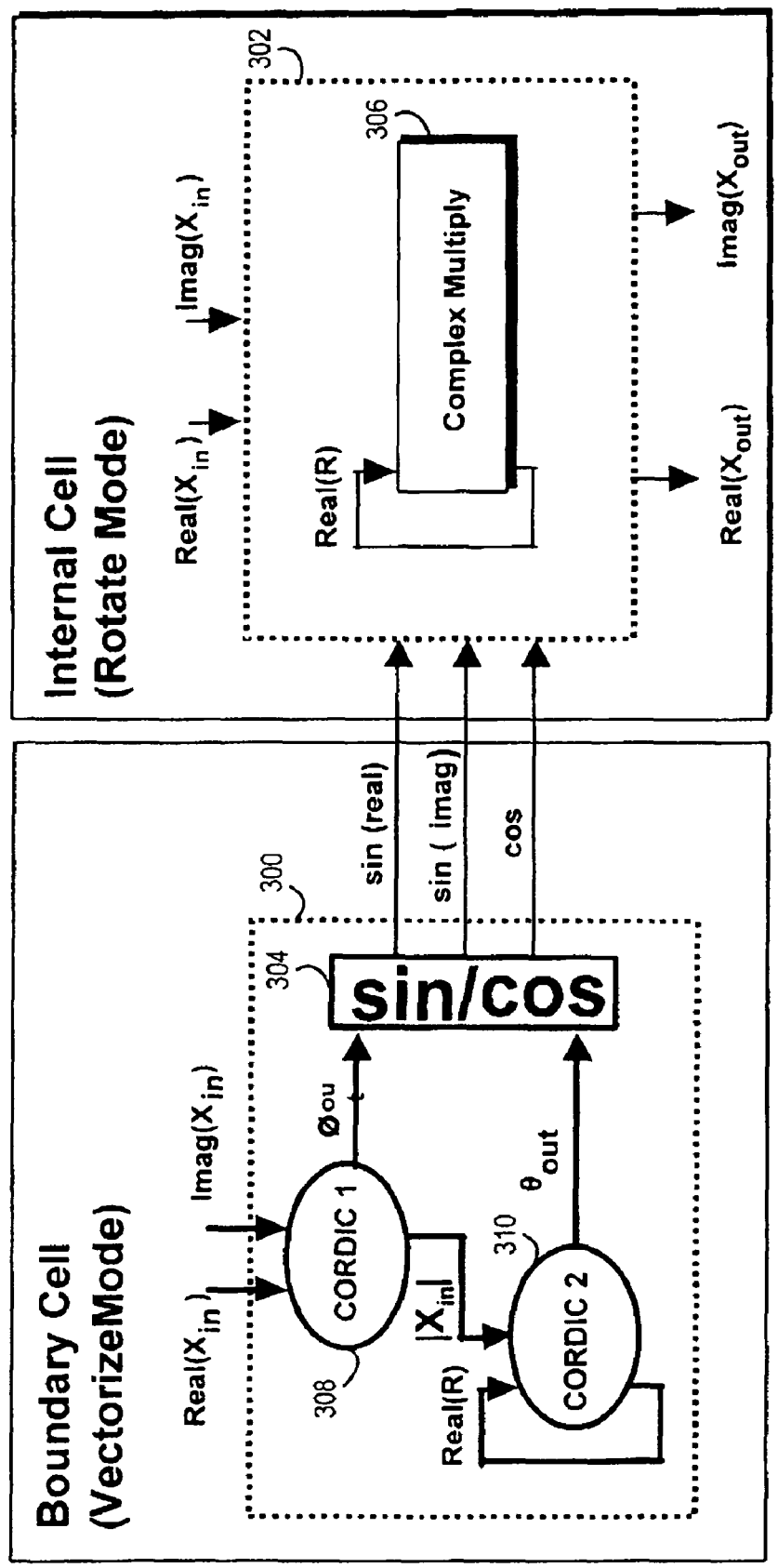
FIG. 13 is a schematic block diagram illustrating mixed Cartesian/polar processing.

FIG. 13 is a schematic block diagram illustrating mixed Cartesian/polar processing for complex inputs. Again, the boundary nodes 300 operate in vectorize mode, and the internal nodes 302 operate in rotate mode. However, this is a different implementation of the node processor, which is transparent to the higher-level architecture.

Each boundary cell 300 has a sin/cos unit 304 which outputs sin and cos components of the or each phase output rather than the or each phase value itself. Thus, internal cells 302 can exploit hard multipliers 306 instead of further CORDIC processes, allowing balancing of resources.

The boundary cell 300 has two CORDIC units 308, 310, which operate in a similar manner to CORDIC units 114, 116 in FIG. 5. CORDIC unit 308 receives real and imaginary components of the input, and outputs the magnitude of the complex input to CORDIC unit 310. CORDIC unit 310 receives the magnitude of the complex input, and the stored R value, and annihilates the magnitude component as described previously, creating a new stored R value.

The boundary cell 300 receives three inputs, the R value, and the real and imaginary components of the input, and it outputs sin and cos components according to the following code (where op is output):

```
//x_in is the input (which is complex), x is the stored value
(which is real)
//lambda is the forgetting factor
mag_sqd=x_in.real( )*x_in.real( )+x_in.imag( ) x_in.imag( )+lambda*x.real( )*x.real( );
cos_op=sqrt(lambda)*x.real/mag_sqd;
sin_op.real( )=x_in.real( )/mag_sqd;
sin_op.imag( )=x_in.imag( )/mag_sqd;
```

Figure 15:
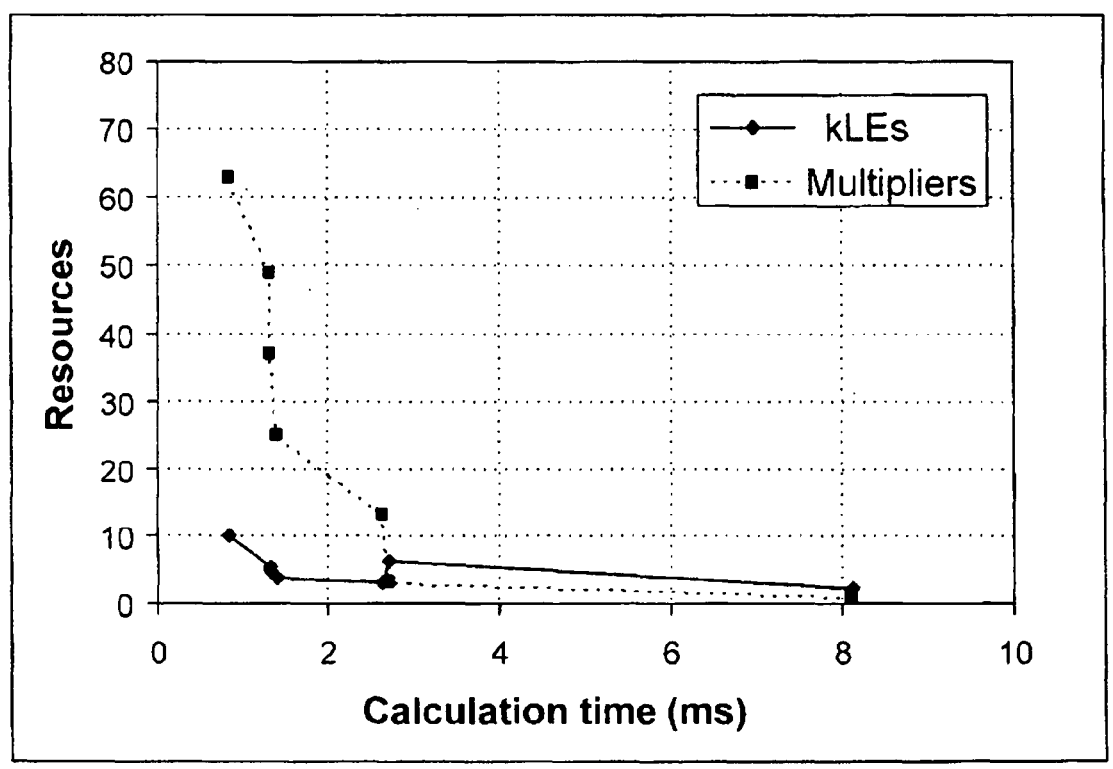
FIG. 15 is a chart of resources versus calculation time, showing the results of mixed Cartesian/polar implementation.
Figure 16:
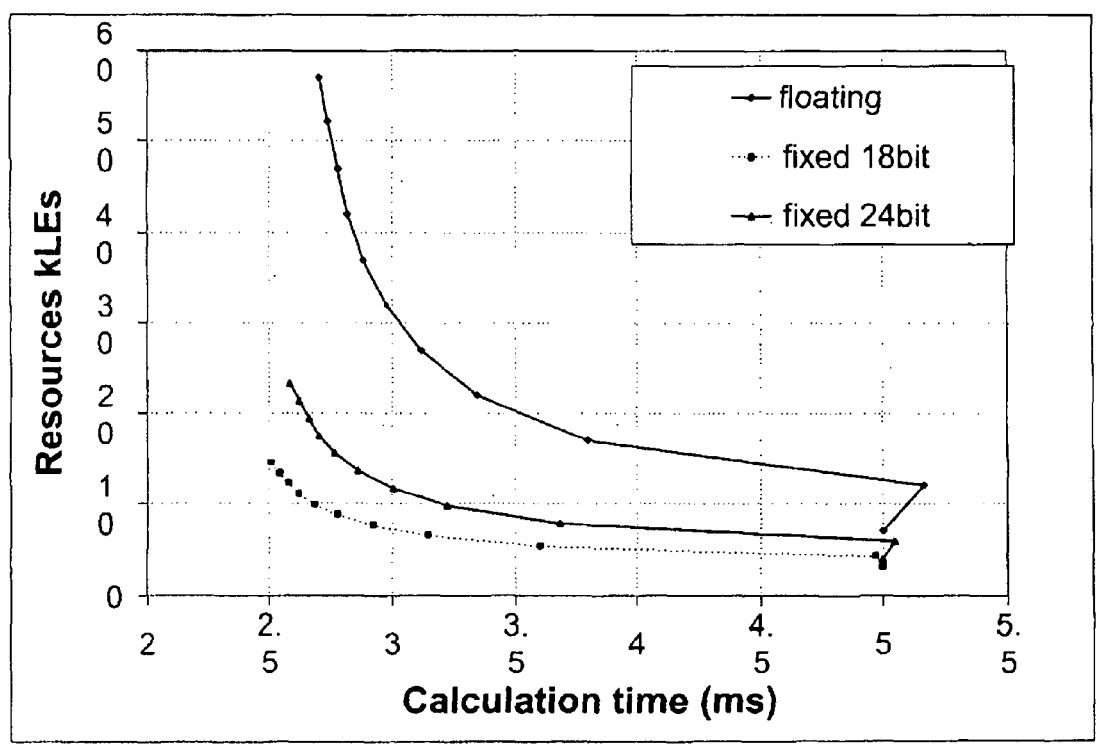
FIG. 16 is a chart of resources versus calculation time, showing the results of mixed Cartesian/polar implementation.

Internal cell 302 comprises hard multiplier 306, which receives real and imaginary components of an input, as well as the sin and cos components output from sin/cos unit 304, and calculations according to the following code (again where op is output):

internal_cell_op.real( )=cos_op*x_in.real( )-sqrt(lambda)* (sin_op.real( )*x.real( )-sin_op.imag( )*x.imag( );
internal_cell_op.imag( )=cos_op*x_in.imag( )-sqrt (lambda)* (sin_op.imag( )*x.real( )+sinop.real( )*x.imag( );
x.real( )=sin_op.real( )*x_in.real( )+sin_op.imag( )*x_in. imag( )+sqrt(lambda)*cos_op*x.real( );
x.imag( )=sin_op.real( )*x_in.imag( )-sin_op.imag( )*x_in. real( )+sqrt(lambda)*cos_op*x.imag( );

This has the advantage of greatly reducing the number of logic elements (LEs) required for fast processing (see FIG. 15).

Figure 14:
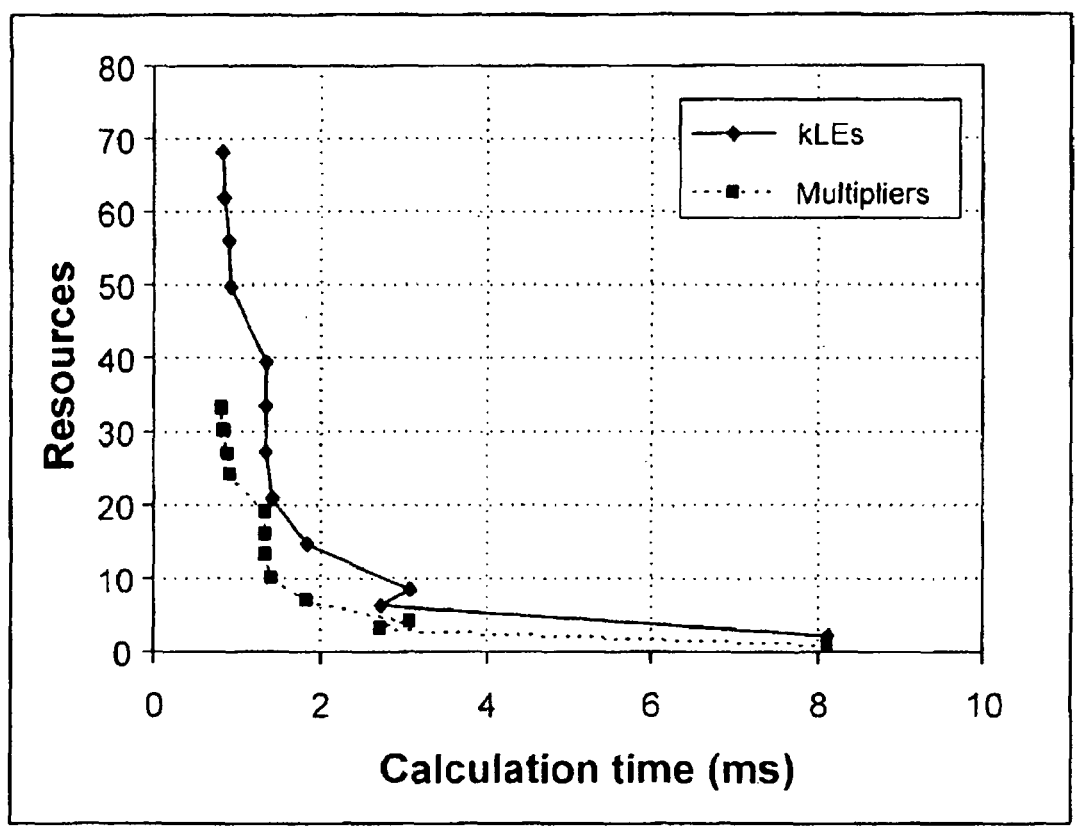
FIG. 14 is a chart of resources versus calculation time, showing the results of full CORDIC implementation.

FIG. 14 illustrates a first example of the results and resource utilization from the implementation of QRD-RLS, in the case where the data width is 16-bit, there are 20 coefficients, and the system performs 2000 iterations. Design space exploration allows trade-off between calculation time and resources.

FIG. 14 shows the results from full CORDIC implementation. Multipliers are used to remove CORDIC scaling; time multiplexing is used where appropriate, between nodes and within nodes; and the system operates with a clock rate of 153.6 MHz.

FIG. 15 shows the results using a similar top-level architecture with mixed polar and Cartesian processing. As can be seen, this results in a higher multiplier utilization, and less usage of logic.

In the implementation of the processing unit for performing the RLS algorithm, for example, in order to provide an adaptive filtering system, a "forgetting factor" (λ) is applied. The result is more heavily weighted towards recent inputs $0<\lambda\leq1$. If $\lambda=1$, the system is not adaptive (i.e. conventional QRD is implemented).

It is necessary to scale all R values in the array by sqrt(λ) after every beat. In order to implement this, this scaling is combined with the scaling that is required on the output of the CORDIC block (e.g. in a hard multiplier). More specifically, the scaling can be implemented as a series of shift-and-adds, or with a multiplier.

As mentioned previously, the overall design includes an input-formatting block to put the data input into the correct format for processing. There are three main options for the number format to be used.

Firstly, there is standard fixed-point format, e.g. Q1.15. In this case, one potentially needs to provide scaling in the input block to avoid overflow. RLS scaling by a forgetting factor will also ensure overflow does not occur.

Secondly, there is floating-point format, e.g. IEEE-754, single precision format. This typically provides greater accuracy, and a large dynamic range.

Thirdly, there is block floating-point format. In this case, all R matrix values share one exponent. This provides a large dynamic range, with lower complexity than true floating point.

In the case of a floating-point implementation, the format can be the same as IEEE-754, or custom mantissa and exponent size.

Received data must be subject to input conditioning, to convert from the input format (e.g. fixed-point) to floating-point format. Specifically, it is necessary to detect the number of leading zeroes, shift the mantissa, and decrement the exponent.

The CORDIC operation must be modified. Specifically, a floating-point wrapper must be provided for a fixed-point CORDIC block. One possibility is to right-shift the mantissa of the smaller of the two X and Y inputs to the CORDIC block, so that the exponents are the same. Then, it is possible to perform CORDIC operations as normal, and then normalize X and Y output (zero-detect, shift mantissa, increment/decrement exponent). Phase output can be left as fixed-point. This is not true floating-point, so there is some degradation in performance.

For the output conditioning of the data, backsubstitution can be performed with floating-point numbers, for greater accuracy, or the data can be converted to fixed-point format.

In the case of a block floating-point implementation, there is one single exponent value for all matrix values. Less memory is required, and the wrapper for the CORDIC block can be simpler. This still allows gain in the array; there is no need to scale the input values. The format can be the same as IEEE-754, or custom mantissa and exponent size.

The input conditioning is the same as conventional floating-point. However, the sequence of operations is modified.

Assuming there is a maximum of x2 gain per beat, exp_shift is set to 0 at the start of the beat. The R value and input value are shifted by one bit if required (see below to determine if required). CORDIC operation is performed as normal, with additional bits provided in the CORDIC block to allow gain. If the magnitude of any output value>1.0, flag exp_shift is marked as 1 but values are stored as normal. At the end of the beat, exponent=exponent+exp_shift.

If exp_shift==1, then, on the next beat, reset exp_shift to zero, and right shift all R values and IO values between nodes by one place before processing.

For output conditioning in block floating-point format the exponent can be ignored, as it is the same for all R matrix values and therefore cancels in the backsubstitution calculation.

Alternatively it is possible to convert to conventional floating-point format for better resolution in backsubstitution calculation.

Figure 17:
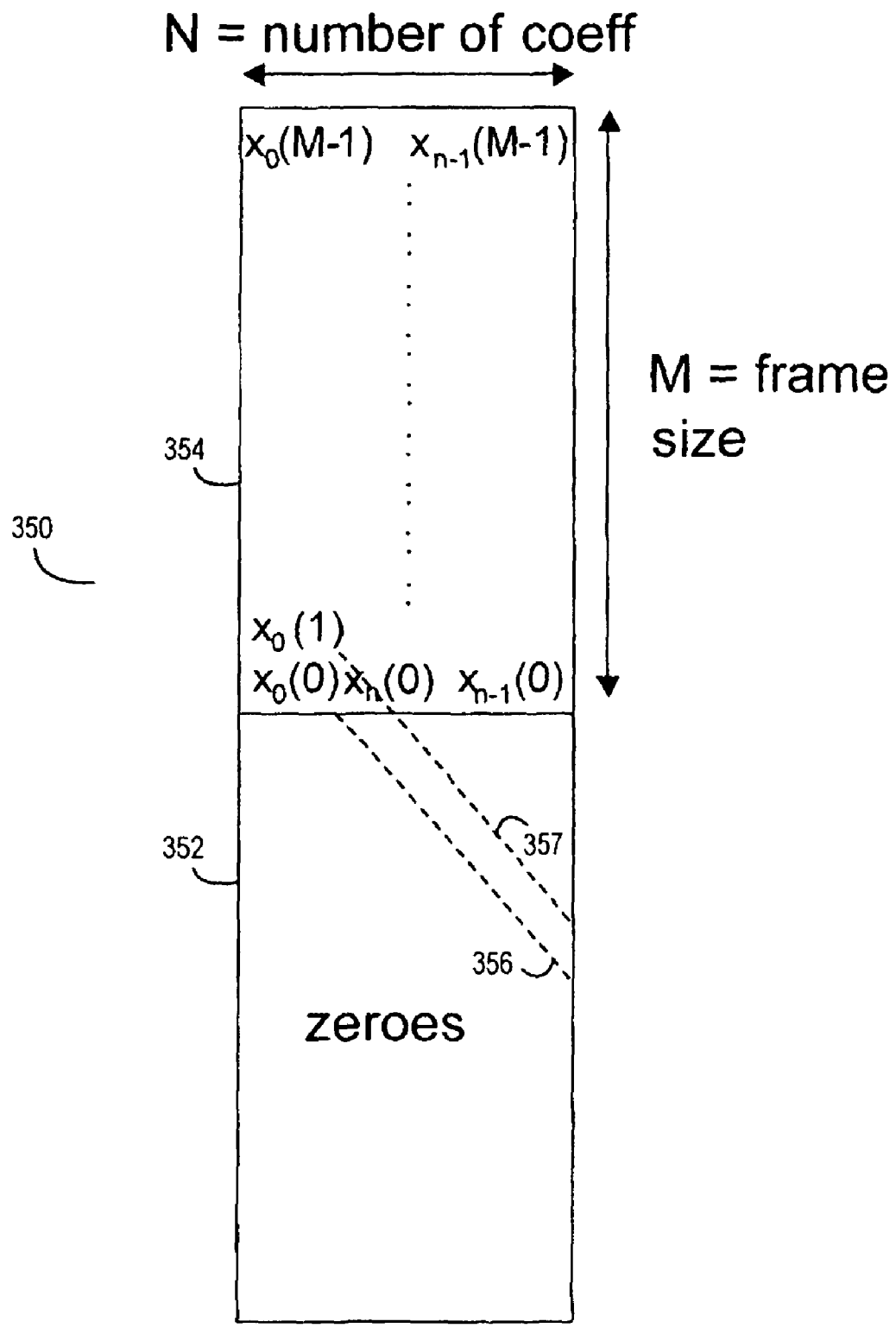
FIG. 17 is a chart of resources versus calculation time, showing the results of mixed Cartesian/polar implementation.

FIG. 17 shows a comparison of the use of fixed- and floating-point data in the RLS calculation, in the case where there are 20 coefficients, and the system performs 2000 iterations. The clock rate is 150 MHz. Specifically, FIG. 17 shows the comparison between 32-bit floating-point data, and 18- or 24-bit fixed-point data.

The description above sets outs the operation of the systolic array on the input data, but it is also necessary to consider the method of reading data into the systolic array.

Specifically, it is necessary to stagger the inputs to the systolic array to conform to correct processing. The conventional method would be to use shift registers for this, but a large amount of logic would be required for this.

Here an alternative method is proposed of reading in, storing and correctly formatting the input blocks in situ in the memory.

As described previously, FIG. 3 illustrates the inputs to the systolic array. Specifically, the inputs to the systolic array are staggered to ensure the correct order of processing. Zeroes are fed in when starting processing and data follows a diagonal wavefront. Thus, $x_1(0)$ is input, then $x_1(1)$ and $x_2(0)$ are input, then $x_1(2)$, $x_2(1)$ and $x_3(0)$ are input, and so on.

FIG. 17 is a schematic diagram of an input array 350, showing the way in which the input data is conditioned. Input array 350 has a size which is determined by N (number of coefficients), e.g. 20, and M (frame size of input data), e.g. 200. In this illustrated case, the total size=2×N×M (double buffering).

Firstly, the lower half 352 of the input array 350 is initialized to zero, and the upper half 354 of the input array 350 stores the data for the first frame. Data is read into the systolic array at times t(n) sequentially for all N systolic array inputs. Data is read from the input array 350 on diagonals, such that the first input on the first diagonal 356 is $x_0(0)$ followed by N−1 zeroes, then the second diagonal 357 contains $x_0(1)$, $x_1(0)$, followed by N−2 zeroes, and so on.

Figure 18:
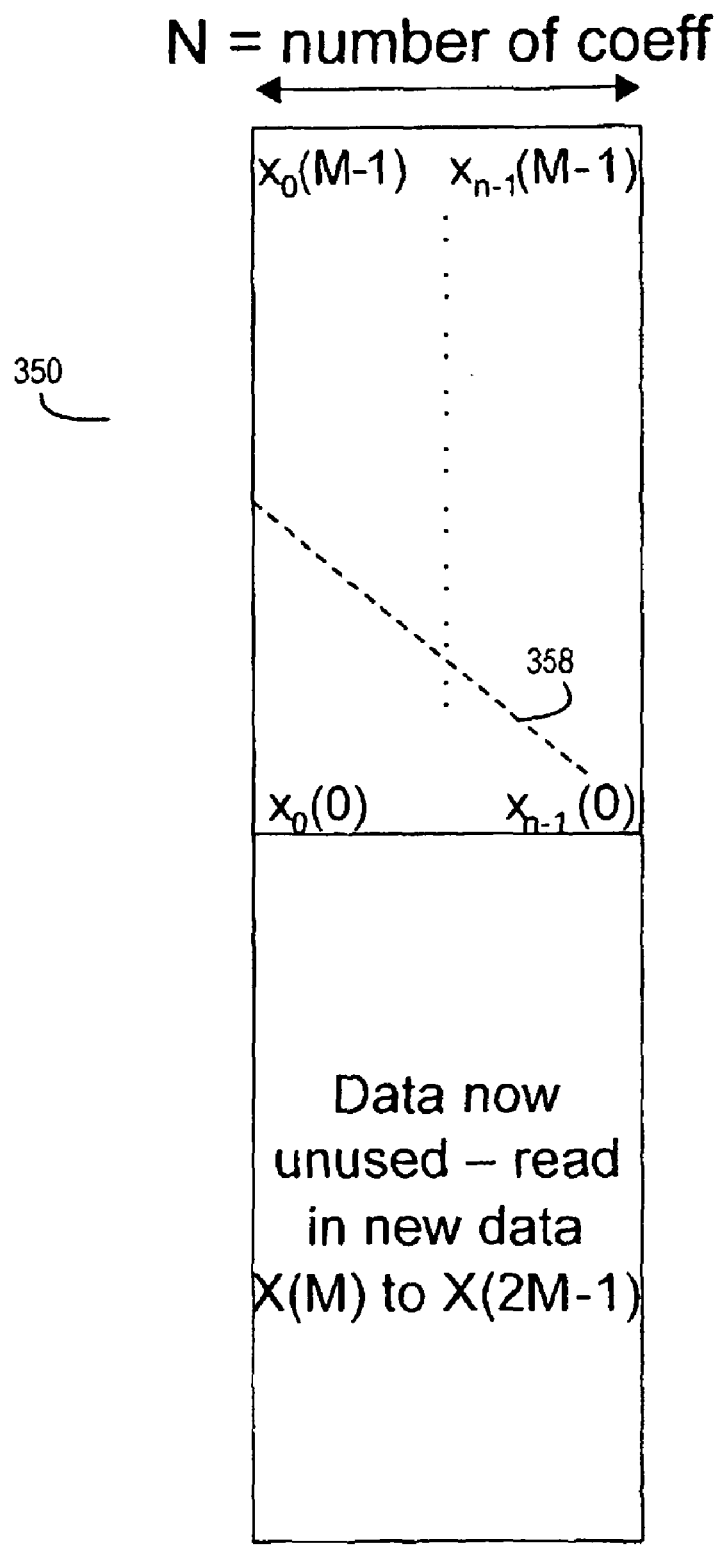
FIG. 18 is a schematic diagram of an input array in accordance with an aspect of the invention.

FIG. 18 is a schematic diagram illustrating the input array 350 at a later time.

Figure 19:
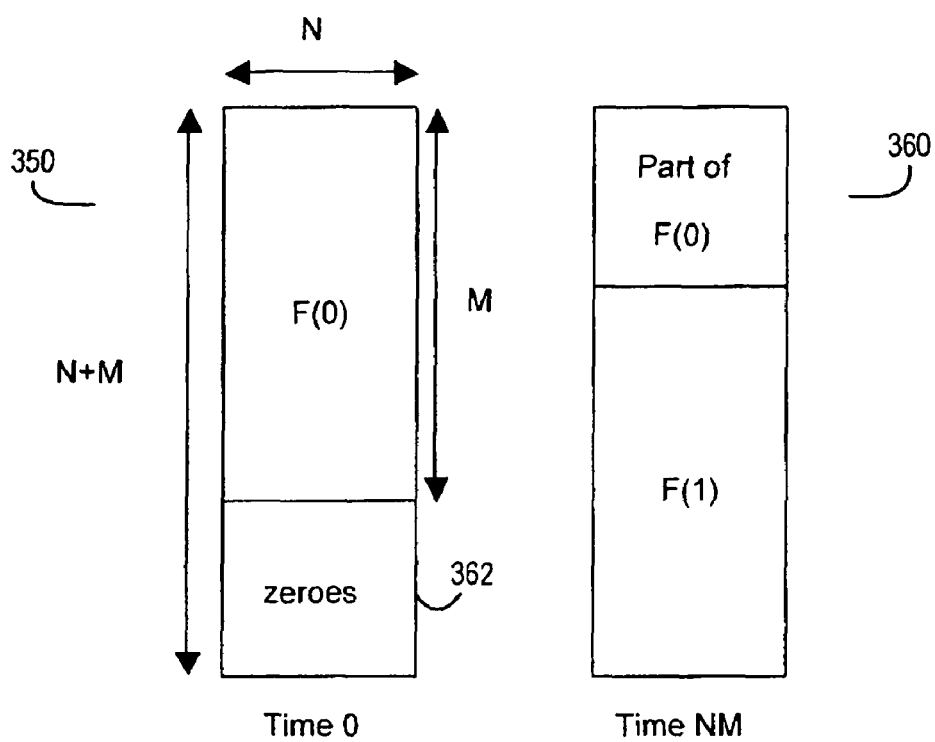
FIG. 19 is a schematic diagram of the input array of FIG. 18 at a later time.
Figure 19:
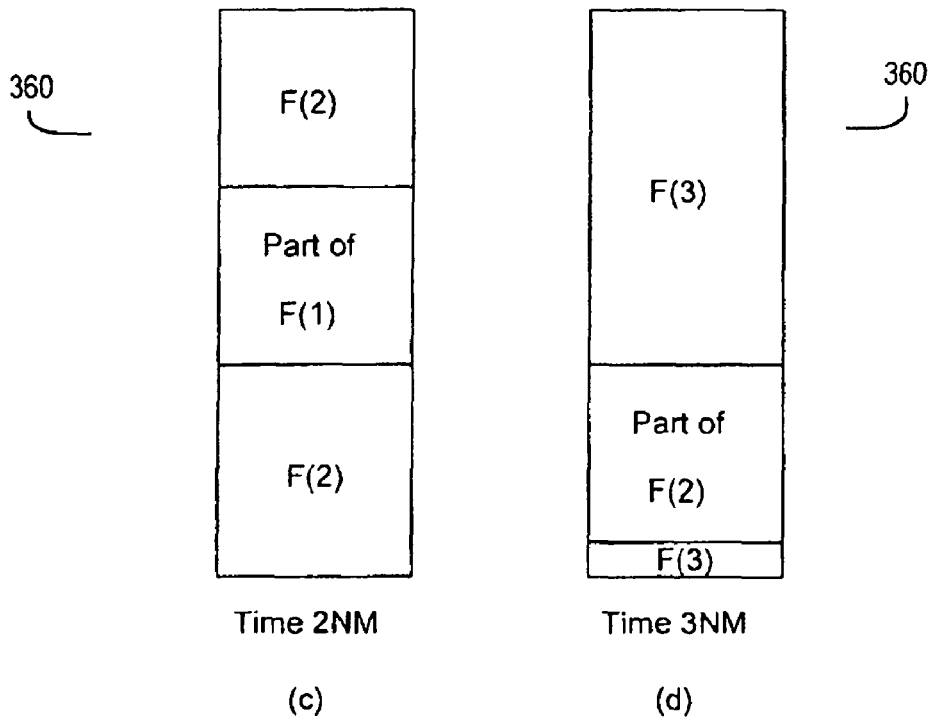

Data continues to be read on diagonals. When diagonal 358 is read out, the lower half 352 of the input array 350 is no longer used, as shown in FIG. 19, and the next frame of input data can be read into the lower half 352 of the input array 350. This occurs after N diagonals have been read out from the input array. Similarly, when the upper half 354 is no longer needed (when a further M diagonals have been read out), the next frame of input data is read in there.

FIG. 19 is a schematic diagram showing the operation of an alternative smaller input array 360.

FIGS. 17 and 18 assumed a buffer size of 2 NM. However, the input buffer can be $N(N+M)=NM+N^2$, as shown in FIG. 19. This is because the size of the overlap region when reading on a diagonal is $N^2$.

After reading in the first frame $F(0)$, with $N^2$ zeroes in the lower part 362 of the input array 360, as shown in FIG. 19(*a*), data is read out on diagonals, as illustrated in FIG. 17. Then, when sufficient memory is available, i.e. after time NM, the next frame, namely $F(1)$, is read in to the input array 360. For some time, both the frames will be required, i.e. the most recent fragment of $F(0)$ and the new samples of $F(1)$. Similarly for subsequent frames:

at time NM, $F(1)$ and the last fragment of $F(0)$ are required as shown in FIG. 19(*b*);

at time 2 NM, $F(2)$ and the last fragment of $F(1)$ are required as shown in FIG. 19(*c*); and at time 3 NM, $F(3)$ and the last fragment of $F(2)$ are required, as shown in FIG. 19(*d*); etc.

Below is the pseudo-code for the input conditioning. This assumes double buffering, with the memory configured as a 10 buffer of size=2 NM bits.

```
valid_count = N;
start_addr = N * M;
while{
    addr=start_addr;
    for i=0;i<N;i++
    {
        //addr = addr −N + 1;
        if (addr < 0)
            addr = addr + 2*N*M
            read out memory at address addr;
    }
    valid_count = valid_count − 1;
    if (valid_count≦0)
    {
        //read in N*M new values into memory
        valid_count = N;
    }
    start_addr = start_addr + N*N;
    if (start_addr≧2*N*M)
        start_addr=start_addr−2*N*M;
}
```

As mentioned above, the data follows a diagonal wavefront. As shown in FIG. 3, data having the same time index, in parentheses, corresponds to a particular time sample. At one instant in time, if processing of the array is stopped, samples on a diagonal correspond to the same time: the top-left of the array being the newest samples; and the bottom-right of the array being the oldest samples.

To perform backsubstitution, an array of outputs corresponding to one time sample is required. The standard method for doing this is the 'stop' method, which will be described briefly below.

The stop method involves stopping processing on a diagonal wavefront. For example, one might stop after sample 6. This would result in the whole array corresponding to the same time sample (for example the whole array would be sample 6). It is easy to extract the data when the array has been fully stopped. This method can be easier to implement when there is more than one processing unit.

In more detail, when the input sample value exceeds a certain time, null values are fed into the systolic array. Zeroes may be able to be fed in, but, in the case of RLS implementation, the forgetting factor will mean that the array values decay with a zero input, and so an additional mechanism is required to prevent this occurring, e.g. a control on the processing unit to suspend processing.

Once the last node has been suspended, the array values are read out to backsubstitution. To reset processing, all array values, IO values and theta values are reset to zero. To restart processing, new data are fed in on a diagonal wavefront (as when starting). The processing unit starts processing data when non-null input is received.

The stop method, therefore, clearly has the disadvantage that processing of the array must be suspended while data is output. Here an alternative method is proposed, termed the 'sample' method, which outputs data from the array 'on the fly'.

In the sample method, samples are extracted corresponding to a particular sample as the processor is operating. A node value is extracted for e.g. sample 6 (i.e. when a sample corresponding to time value 6 is received). Array processing continues as normal, and there is no need to stop the array.

In more detail, one implementation of the sample method is for the programme controller to have a modulo D counter (D_count), where D is the number of diagonals in the systolic array (e.g. 5 in the example illustrated in FIG. 2). In the programme, each node has an associated diagonal value, E. An output is read from the processing unit if D_count=E. For example, these values can be written to a backsubstitution buffer. Once D_count is reset to zero, data is valid. That is, all samples in the backsubstitution buffer correspond to the same time sample. The buffer is valid until the next data sample is written.

When suspending the array processing, it is preferable to ensure suspension only occurs when D_count is reset to zero. Processing is suspended and the backsubstitution buffer is also valid.

With more than one processing unit, several values will be ready to be written to the backsubstitution buffer on the same cycle.

Figure 20:
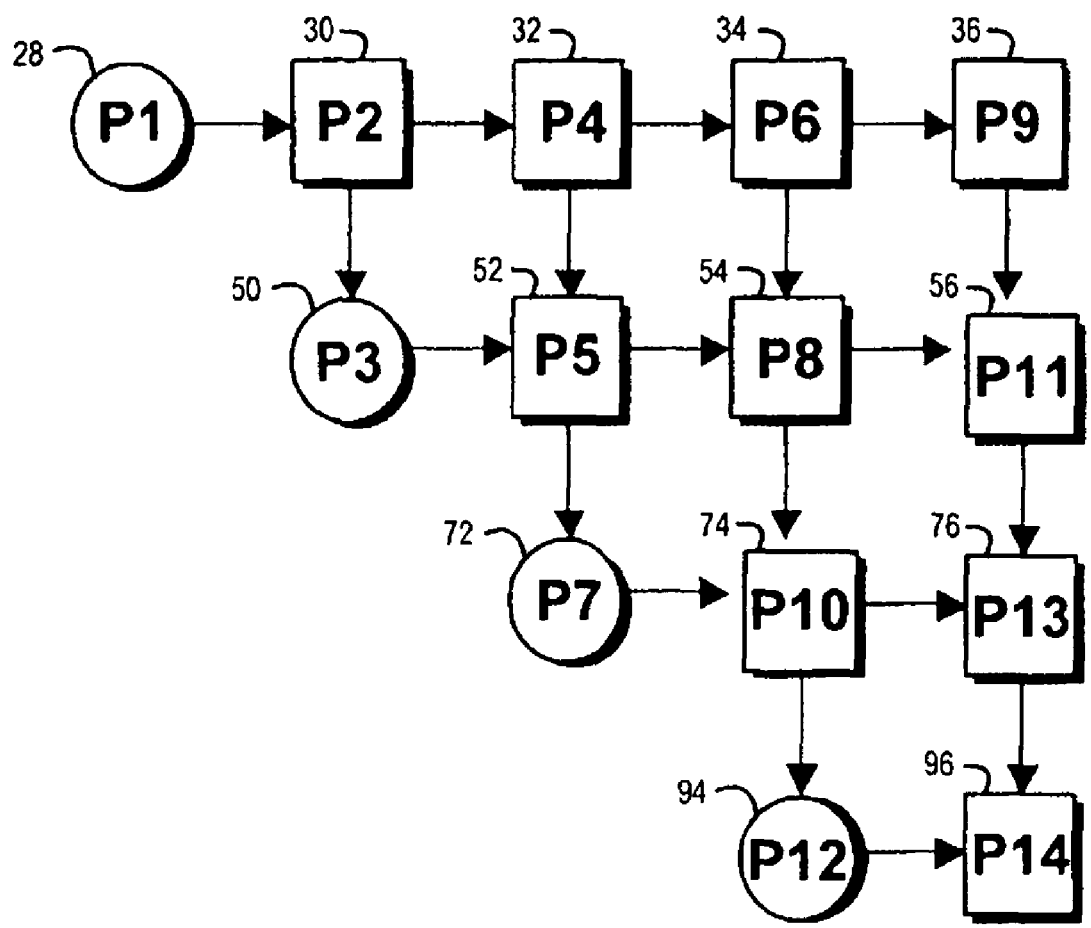
FIG. 20 is a schematic diagram of the operation of a smaller input array in accordance with an aspect of the invention.

FIG. 20 is a schematic block diagram illustrating the order in which data is written to the backsubstitution buffer for the example array given in FIG. 3.

Using the array shown in FIG. 3, the order of output to the backsubstitution buffer is indicated by the order of the numerals P1-P14 shown in FIG. 20.

Data is written to the backsubstitution buffer according to one of the two methods described above. The data is ordered in the sequence it will be processed, namely right-to-left from the bottom. This simplifies the addressing in backsubstitution. Details of the mathematical principles of the backsubstitution method have been given previously.

Backsubstitution can be performed using an embedded or an external processor.

Using an external or embedded processor, the QR-decomposition engine calculates a predefined number of samples and then suspends processing. A DATA_VALID signal indicates that backsubstitution data buffer is valid, and no more data can be written to the backsubstitution buffer. Processing may be suspended or may continue (depending on system requirements).

Then the processor performs the backsubstitution calculation, and outputs the calculated coefficients. A PROCESSOR_READY signal indicates when calculation has finished and the processor is ready for another. Calculation can be done in fixed- (int) or floating-point (float) format. It is possible to improve backsubstitution with hardware accelerators for add, multiply, or divide. Depending on the number of samples per decomposition calculation, the processor may be lightly loaded with backsubstitution only, and can perform other tasks. For example, the processor can be implemented with an Altera Nios II® soft processing core.

Backsubstitution can alternatively be performed using a hardware or custom processor.

This gives a faster calculation time than the processor implementation, and so is more appropriate for faster coefficient updates. Calculation is triggered by the DATA_VALID signal.

Data dependency on divide operation can be mitigated by calculating the reciprocal of the boundary cells as soon as they are ready. Calculation is then multiply and accumulate of available coefficients and reciprocal.

The invention claimed is:

1. A method of supplying data to a systolic array, comprising:
    storing data relating to a first frame in a first component of a buffer memory and storing zeroes in a second component of said buffer memory;
    reading data from said first component of said buffer memory into said systolic array; and, thereafter:
    storing data relating to a second frame in said second component of said buffer memory.

2. A method as claimed in claim 1, wherein said first and second components of said buffer memory are of equal size.

3. A method as claimed in claim 1, wherein said first and second components of said buffer memory are each of a size equal to the product of the frame size and a number of coefficients of said systolic array.

4. A method as claimed in claim 1, wherein said first component of said buffer memory is larger than said second component of said buffer memory, and data relating to the second frame is also stored in a part of said first component of said buffer memory.

5. A method as claimed in claim 1, wherein said first component of said buffer memory is of a size equal to the product of the frame size and a number of coefficients of said systolic array, and said second component of said buffer memory is of a size equal to the square of the number of coefficients of said systolic array.

6. A processor for supplying data to a systolic array, the processor comprising:
    a buffer memory comprising:
        a first component configurable to store data relating to a first frame, and
        a second component configurable to store zeroes; and
    a processing unit configurable to read data from said first component of said buffer memory into said systolic array,
    wherein said second component of said buffer memory is further configurable to store data relating to a second frame.

7. A processor as claimed in claim 6, wherein said first and second components of said buffer memory are of equal size.

8. A processor as claimed in claim 6, wherein said first and second components of said buffer memory are each of a size equal to the product of the frame size and a number of coefficients of said systolic array.

9. A processor as claimed in claim 6, wherein said first component of said buffer memory is larger than said second component of said buffer memory, and data relating to the second frame is also stored in a part of said first component of said buffer memory.

10. A processor as claimed in claim 6, wherein said first component of said buffer memory is of a size equal to the product of the frame size and a number of coefficients of said systolic array, and said second component of said buffer memory is of a size equal to the square of the number of coefficients of said systolic array.

11. A system for supplying data to a systolic array, comprising:
    means for storing data relating to a first frame in a first component of a buffer memory and storing zeroes in a second component of said buffer memory;
    means for reading data from said first component of said buffer memory into said systolic array; and
    means for storing data relating to a second frame in said second component of said buffer memory.

12. A system as claimed in claim 11, wherein said first and second components of said buffer memory are of equal size.

13. A system as claimed in claim 11, wherein said first and second components of said buffer memory are each of a size equal to the product of the frame size and a number of coefficients of said systolic array.

14. A system as claimed in claim 11, wherein said first component of said buffer memory is larger than said second component of said buffer memory, and data relating to the second frame is also stored in a part of said first component of said buffer memory.

15. A system as claimed in claim 11, wherein said first component of said buffer memory is of a size equal to the product of the frame size and a number of coefficients of said systolic array, and said second component of said buffer memory is of a size equal to the square of the number of coefficients of said systolic array.

* * * * *